United States Patent [19]

Gawlick et al.

[11] Patent Number: 4,507,751
[45] Date of Patent: Mar. 26, 1985

[54] METHOD AND APPARATUS FOR LOGGING JOURNAL DATA USING A LOG WRITE AHEAD DATA SET

[75] Inventors: Dieter Gawlick, Los Altos; James N. Gray, San Francisco; Wallace M. Iimura, Cupertino; Ronald L. Obermarck, Los Altos, all of Calif.

[73] Assignee: International Business Machines Corporation, Armonk, N.Y.

[21] Appl. No.: 390,485

[22] Filed: Jun. 21, 1982

[51] Int. Cl.³ .............................................. G06F 15/20
[52] U.S. Cl. ................................................... 364/900
[58] Field of Search ... 364/200 MS File, 900 MS File, 364/300

[56] References Cited

U.S. PATENT DOCUMENTS

| 4,020,466 | 4/1977 | Cordi et al. | 364/200 |
| 4,044,337 | 8/1977 | Hicks et al. | 364/200 |
| 4,077,059 | 2/1978 | Cordi et al. | 364/200 |
| 4,084,231 | 4/1978 | Capozzi et al. | 364/200 |
| 4,159,517 | 6/1979 | Paradine et al. | 364/200 |
| 4,399,504 | 8/1983 | Obermarck et al. | 364/200 |

OTHER PUBLICATIONS

Mellow, et al., "Method and Apparatus for Logging Journal Data in a Continuous Address Space Across Main Storage, Direct Access, and Sequential Access Devices", U.S. Patent Application, Ser. No. 6-390454, Filed 06/21/82, (SA9-81-48).
IBM, "JCCP Introduction", an Undated, Unpublished Description of the Japan Common Control Program.
IBM, "JCCP General Macro", Dated 07/02/1975.

Primary Examiner—Raulfe B. Zache
Attorney, Agent, or Firm—Shelley M. Beckstrand; R. Bruce Brodie

[57] ABSTRACT

The invention provides a computing apparatus and method for maintaining a journal log. The computing apparatus includes volatile storage for storing a log buffer and a non-volatile storage for storing a journal log. Non-volatile storage means are provided for storing in a write-ahead data set a plurality of short data blocks. The log buffer contents are written to the write-ahead data set responsive to a process epoch occurring before the log buffer is filled. The log buffer contents are written to the journal log upon the log buffer being filled. The redoing or undoing of data base changes is made with reference to the write ahead data set only in the case of a system failure resulting in loss of log buffer data not yet written to the journal log; otherwise data base changes are redone or undone with reference to the log buffer or journal log.

5 Claims, 11 Drawing Figures

SAMPLE IOB

| MBBCCHHR |
|---|
| ->CCW1 |
| / / |
| (EXTENSION) |
| / / |
| WADS-BLOCK |
| WADS-OFFSET |

FIG.6

SAMPLE CHANNEL COMMAND

| | COMMAND | ADDR | FLAGS | LENGTH | |
|---|---|---|---|---|---|
| CCW1 | SEARCH KEY EQUAL | =X'00' | CC | 1 | |
| | TIC | CCW1 | | 0 | SET 1 |
| | WRITE DATA | IDAW1 | CC IDA | 2062 | |
| | TIC | CCW2 | | 0 | |
| IDAW1 | ->2KB SEGMENT | | -> SUFFIX | | |
| CCW2 | SEARCH KEY EQUAL | =X'00' | CC | 1 | |
| | TIC | CCW2 | | 0 | SET 2 |
| ** | WRITE DATA | IDAW2 | IDA | 2062 | |
| | TIC | CCW3 | | 0 | |
| IDAW2 | ->2KB SEGMENT | | -> SUFFIX | | |

FIG.7

| | RCD 1 | RCD 2 | RCD 3 | RCD 4 | RCD 5 | RCD 6 |
|---|---|---|---|---|---|---|
| GRP 1 TRK 1 | BLK 100 T/S 200 SEG 001 | BLK 030 T/S 102 SEG 001 | BLK 104 T/S 210 SEG 001 | BLK 100 T/S 201 SEG 011 | BLK 104 T/S 216 SEG 120 | BLK 104 T/S 216 SEG 121 |
| GRP 1 TRK 2 | BLK 030 T/S 110 SEG 010 | BLK 100 T/S 202 SEG 010 | BLK 100 T/S 202 SEG 011 | BLK 104 T/S 227 SEG 230 | BLK 104 T/S 227 SEG 231 | BLK 100 T/S 204 SEG 111 |
| GRP 1 TRK 3 | BLK 104 T/S 248 SEG 331 | BLK 000 T/S 000 SEG 000 | BLK 100 T/S 207 SEG 230 | BLK 100 T/S 207 SEG 231 | BLK 104 T/S 230 SEG 331 | BLK 104 T/S 242 SEG 331 |
| GRP 1 TRK 4 | BLK 030 T/S 120 SEG 011 | BLK 100 T/S 203 SEG 120 | BLK 104 T/S 245 SEG 331 | BLK 030 T/S 130 SEG 111 | BLK 104 T/S 235 SEG 331 | BLK 100 T/S 203 SEG 121 |
| GRP 1 TRK 5 | BLK 104 T/S 215 SEG 011 | BLK 100 T/S 201 SEG 001 | BLK 030 T/S 102 SEG 001 | BLK 030 T/S 114 SEG 010 | BLK 030 T/S 114 SEG 011 | BLK 104 T/S 215 SEG 010 |

FIG.8

| GRP 1 | | | BLK 104 | | BLK 104 | BLK 104 |
| TRK 1 | | | T/S 210 | | T/S 216* | T/S 216 |
| | | | SEG 001 | | SEG 120 | SEG 121 |
| GRP 1 | | | | BLK 104 | BLK 104 | |
| TRK 2 | | | | T/S 227* | T/S 227 | |
| | | | | SEG 230 | SEG 231 | |
| GRP 1 | BLK 104 | | | | BLK 104 | BLK 104 |
| TRK 3 | T/S 248* | | | | T/S 230 | T/S 242 |
| | SEG 331 | | | | SEG 331 | SEG 331 |
| GRP 1 | | | BLK 104 | | BLK 104 | |
| TRK 4 | | | T/S 245* | | T/S 235 | |
| | | | SEG 331 | | SEG 331 | |
| GRP 1 | BLK 104 | | | | | BLK 104 |
| TRK 5 | T/S 215 | | | | | T/S 215* |
| | SEG 011 | | | | | SEG 010 |

FIG. 9

| GRP 1 | BLK 104 | BLK 104 | | |
| TRK 5 | T/S 215 | T/S 215 | | |
| | SEG 010 | SEG 011 | | |
| GRP 1 | | BLK 104 | BLK 104 | |
| TRK 1 | | T/S 216 | T/S 216 | |
| | | SEG 120 | SEG 121 | |
| GRP 1 | | | BLK 104 | BLK 104 |
| TRK 2 | | | T/S 227 | T/S 227 |
| | | | SEG 230 | SEG 231 |
| GRP 1 | | | | BLK 104 |
| TRK 3 | | | | T/S 248 |
| | | | | SEG 331 |

| OLDS | BLK 104 | BLK 104 | BLK 104 | BLK 104 |
| BLOCK | T/S 215 | T/S 216 | T/S 227 | T/S 248 |
| 104 | SEG 010 | SEG 120 | SEG 230 | SEG 331 |

FIG. 10

METHOD AND APPARATUS FOR LOGGING JOURNAL DATA USING A LOG WRITE AHEAD DATA SET

BACKGROUND OF THE INVENTION

1. Field of the Invention

This invention relates to a new computing apparatus and method for journalling the creation, deletion and modification of recoverable objects including messages, data base records or tuples, and persistent systems states.

2. Description of the Prior Art

In the operation of computing systems, it is the practice to provide a data base management system which operates under an operating system to manage the creation, deletion, and modification of records stored in a data base. Such data base management systems, especially those which process multiple, concurrent transactions, are required to maintain the integrity of the data base in spite of the possibility of (1) failure of the media upon which the data base is recorded, (2) failure of the computing system in which the data base management system is operating, or (3) failure of one or more of the transactions to successfully complete its processing. These failures may be the result of complete loss of power to the computing system's main storage. Because main storage is generally volatile, and requires power to maintain the information contained therein, such a power loss will result in loss of knowledge by the system as to its own state, the state of processes under its control, and information with respect to changes being made to the data base.

In order to recover from such failures, prior art data base management systems provide a journal of changes made to the data base, of messages, and of persistent system states. Such a journal is stored in blocks in either volatile main storage buffers or non-volatile storage devices, such as magnetic tape or disks. (The term "block" refers to a collection of one or more records either in main storage buffers or in non-volatile storage devices.) Initially, the data is stored in buffers because these are directly addressable by the instruction processing unit. Subsequently, the data is moved to non-volatile storage blocks, either because the buffer is filled or because the data must be permanently stored. For performance and storage efficiency, large buffer and storage block sizes are preferred. However, only data stored in non-volatile storage blocks is persistent. Thus, when process epochs (such as synchronization or commit points) occur which assume that journal data will persist, the data in buffers must be transferred into such storage blocks. These process epochs do not normally coincide with buffer overflow epochs, so a way must be provided to store partially filled, or truncated, buffers. Traditionally, this is done by rewriting storage blocks.

In one prior art logging technique which rewrites storage blocks, journalling is accomplished by writing log records to an on-line data set (OLDS), and rewriting OLDS blocks which are partially filled. Such a system is exposed to the loss of data if a power failure occurs during the time that the OLDS block is being rewritten, resulting in termination of an in-process write with the remainder of the storage block being filled out with zeros. In addition, there is substantial latency in this technique, as a specific OLDS block must be located for rewriting.

In another prior art logging technique, a pair of tracks are preformatted on a non-volatile file, such as a fixed head file, in addition to the OLDS, with each block in the formatted track having the same record number. This data set is written when a process epoch occurs, with each write to alternate tracks. The use of the same record number for all blocks makes the track incomprehensible to existing dump-restore utilities, but does reduce latency losses when writing incomplete OLDS blocks. That is, such utilities will dump only one block, and only one block is restored. Thus, if a dump-restore action is executed against the fixed head file after system failure but before the file is written out to a journal tape or disk device, information may be lost. Further, in this technique, the fixed head file blocks are the same size as OLDS blocks, and it is necessary to establish a tradeoff between the size of OLDS blocks (which are preferably large for efficiency of the write operation from main storage buffers) and the size of the fixed head file blocks (which are preferably short to avoid extensive rewrite of the block with each process epoch.)

SUMMARY OF THE INVENTION

The invention provides a computing apparatus for maintaining a journal log. The computing apparatus includes volatile storage for storing a log buffer and a non-volatile storage for storing a journal log. The improvement comprises non-volatile storage means for storing in a write-ahead data set a plurality of short data blocks; means responsive to a process epoch occurring before the log buffer is filled for forcing log buffer contents to said write-ahead data set; means for writing the log buffer contents to the journal log upon the log buffer being filled; and means for redoing or undoing data base changes with reference to the write ahead data set only in the case of a system failure resulting in loss of log buffer data not yet written to the journal log, otherwise for redoing or undoing data base changes with reference to the log buffer or journal log.

The invention further provides a method for operating a computing apparatus which includes a volatile storage for storing a log buffer, a non-volatile storage for storing a journal log, and a non-volatile data set. The non-volatile data set is preformatted to provide a write ahead data set for storing a plurality of short data blocks. Responsive to a process epoch occurring before the log buffer is filled, log buffer contents are stored in short data blocks on the write ahead data set. Log buffer contents are written to the journal log upon the log buffer being filled. And data base changes are redone or undone with reference to the write ahead data set only in the case of a system failure resulting in loss of log buffer data not yet written to the journal log, otherwise data base changes are redone or undone with reference to the log buffer or journal log.

BRIEF DESCRIPTION OF THE DRAWINGS

FIG. 6 is a diagrammatic illustration of a sample WADS input/output block (IOB).

FIG. 7 is an illustration of a channel command chain (CC) for writing two segments to the WADS.

FIG. 8 is a table illustrating how a track group (TRKGRP) might look at time of failure reconstruction.

FIG. 9 is a table illustrating "interesting" records at reconstruction.

FIG. 10 is a table illustrating reconstruction of an OLDS block.

DESCRIPTION OF THE PREFERRED EMBODIMENT

Figure 1:
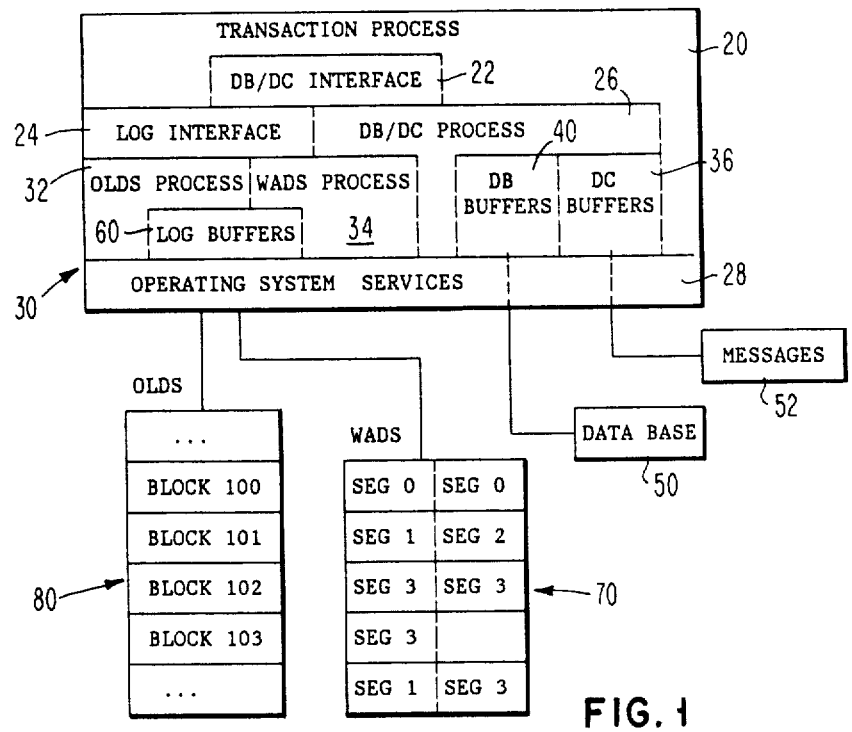
FIG. 1 is diagrammatic illustration of the apparatus of the invention, showing the central processing unit with volatile storage buffers, a write ahead data set (WADS) and on-line data set (OLDS).

In FIG. 1, a general view of the system in which the invention is implemented is illustrated. Herein, transaction process 20 may be an application program running under an information management system such as the IBM IMS/VS, as is described in IMS/VS Version 1 Primer, Program Number 5740-XX2, IBM Publication SH20-9145-0 File No. S370-50, First Edition (September 1978), and as subsequently revised. Included within the facilities provided by IMS are data base/data communication (DB/DC) interface 22, log interface 24, DB/DC process 26, OLDS process 32, DB buffers 40, DC buffers 36, and log buffers 60. The invention may be implemented, in one preferred embodiment, as an enhancement to the IMS OLDS process 32 and log interface 24 together with the addition of WADS process 34. As will be further explained, the procedure of Table 1 describes changes to log interface 24 and a portion of WADS process 34. The procedure of Tables 2–6, and 8 describe further portions of WADS process 34, and the procedure of Table 7 describes further changes to the OLDS process 32. Buffers 36 and 40 are allocated from main storage for communication of messages 52 and data with respect to data base 50, both under control of operating system services 28. Operating system 28 may be, for example, an IBM OS/MVS or OS/VS1 system executing on an IBM System/360 or System/370. The IBM System/360 is described in U.S. Pat. No. 3,400,371 by G. M. Amdahl, et al, and the IBM System/370 in IBM System/370 Principles of Operation, IBM Publication GA22-7000-6. The present invention is further related to that described and claimed in copending application Ser. No. 06/390,454, filed June 21, 1982, by C. Mellow, et al, for "Method and Apparatus for Logging Journal Data in a Continuous Address Space Across Main Storage, Direct Access, and Sequential Access Devices," of common assignee, assignee's docket number SA981048.

Referring to FIG. 1, in accordance with the invention, a journalling system and method is provided which uses main storage log buffers 60, and two data sets: blocks of temporary non-volatile storage (WADS 70), and blocks of permanent non-volatile storage (OLDS 80).

WADS 70 is written in response to a request from a user 20 or 30 of the log 80 which requires that its log records be non-volatile before the user can continue. This occurs most often when a process must commit changes. This is variously referred to and/or similar in function to commiting, synchronizing, or SYNCHing changes, and the word "commit" will generally be used to refer to it. In a high volume transaction processing environment the commit process can occur hundreds of times per second, and if each commit or SYNCH requires that a complete OLDS buffer 60 be written to DASD, this significantly delays processing of program 20 and impacts overall system performance.

As is known in the art, log records which contain recovery information for changes to a data base must themselves be recorded in the non-volatile log to protect against the loss of data upon the occurance of a failure. Write-ahead-log, or log write ahead, refers to a procedure which ensures that the log is written prior to making changes to the data base. In transaction processing systems, the same write-ahead-log procedure is used to maintain the integrity of other data created or modified by a transaction, such as telecommunication messages.

Also known in the art is the integrity concept of transaction, or atomic unit of work. That is, all work done on behalf of a transaction either must complete or else none of the work must appear to have completed. One example is a funds transfer transaction which removes (subtracts) an amount from one account, and places (adds) it into another account. It is appearant that if one of the operations were to occur without the other, that the account data base would lose its integrity. This same integrity concept is required for other actions which are performed. If an automatic cash dispensing terminal is included in a funds transfer system, the transaction could include sending a message to dispense a given amount of money after transfering the amount from the account of the person at the terminal to a dispensed-cash account. Again, if any of the actions occur without the others, integrity is lost.

The implementation of a transaction, or atomic unit of work, includes a point in time or system state at which the transaction is committed or terminated. This critical point is usually represented by a single record written to the non-volatile log or journal. In the terminology of IMS/VS, the commit point is called a synch point. The log write ahead protocol and the commit protocol are examples of process epochs.

Figure 2:
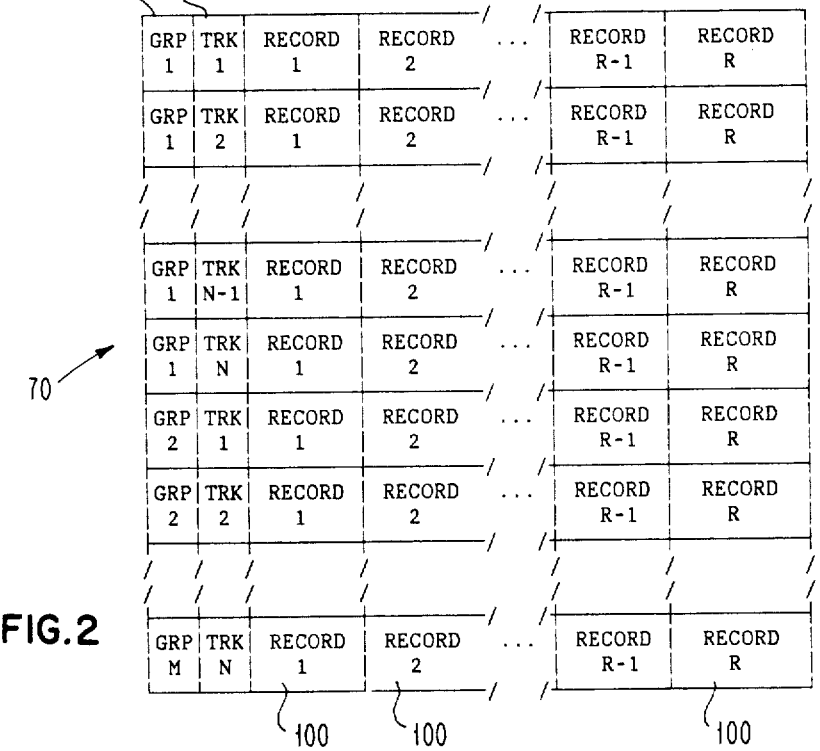
FIG. 2 is a diagrammatic illustration of the logical organization of the write ahead data set (WADS) on a direct access storage device (DASD).

OLDS 80 is organized as a sequential set of blocks 101, 102, 103, . . . on non-volatile storage together with blocks in log buffers 60 not yet filled and written to non-volatile storage. WADS 70 is organized as segments (also referred to as short blocks) on a plurality of tracks (five tracks are illustrated) in fixed length, direct access files. An expanded version of WADS 70 is illustrated in FIG. 2, to be described below. The OLDS 80 blocksize equals the size of log buffer 60, the size of blocks on WADS 70 may be smaller, and when smaller may be referred to as "short blocks", or physical records. If truncation of a buffer 60 is required due to SYNCH POINT or some similar process event being communicated to control program 30 (which includes DB/DC interface 22, log interface 24, DB/DC process 26, OLDS process 32, WADS process 34, and operating services 28) from application or transaction process 20, then the truncated buffer 60 is written to WADS 70 with control information describing the truncated portion of buffer 60 being stored and including the buffer sequence number (which is the relative block numer within OLDS 80 where the contents of buffer 60 will be stored when filled, if there is no intervening system failure). This will be further described below in connection with FIG. 5. During restart, WADS 70 is read to reconstruct any partially filled buffers 60 (which may be viewed as OLDS blocks which have not yet been written to OLDS 80).

WADS 70 blocks (or records) are partitioned by the tracks which contain them into two classes: first, blocks on tracks containing data that has not yet been written to an OLDS 80 block on non-volatile storage; and, second, blocks on all other tracks. Only blocks of the second class will be selected to receive data from truncated log buffers 60. Once a buffer 60 is filled and written to a non-volatile OLDS 80 block, the associated WADS 70 blocks are freed, and the corresponding tracks assigned to the second class. Thus, no WADS 70 track contains data from two distinct buffers unless at least one of these buffers has been written into an OLDS 80 block.

The present invention requires two data sets: the OLDS 80 and WADS 70. OLDS 80 is the log data set, and is allocated to some non-volatile storage device. While not illustrated because it is not an essential part of the present invention, in most implementations it would be expected that OLDS 80 would be at least duplexed, and that multiple versions would be allocated with an off-line archival process which provides for the emptying of filled data sets. Further, as would be apparent to those skilled in the art, appropriate control procedures would normally be employed to ensure that when one version of OLDS 80 is filled, that an empty version (either newly-allocated or an old version emptied by the archival process) is chosen as the currently active OLDS 80.

The block size of OLDS 80 is specified as N. In the embodiment being described, by way of example only, N is a multiple of 2K (where K = 1024 bytes), within the range 4K to 30K, inclusive.

Referring to FIG. 2, the write ahead data set (WADS 70) is logically organized in groups 105 of tracks 110, with the number of tracks 110 per group 105 being equal, in this embodiment, to the number N−1 of 2K segments contained in an on-line log data set (OLDS 80) block, plus one (TRK N). The additional track 110 (TRK N) per group ensures that a different track can be written each time one or more segments 150 require writing to WADS 70 from a buffer 60.

The number of records 100 on each track 110 is dependent upon the track capacity of the device to which WADS 70 is allocated. The number of groups 105 of tracks 110 is the quotient of the number of tracks allocated for WADS 70, divided by the number of tracks required per group.

Figure 3:
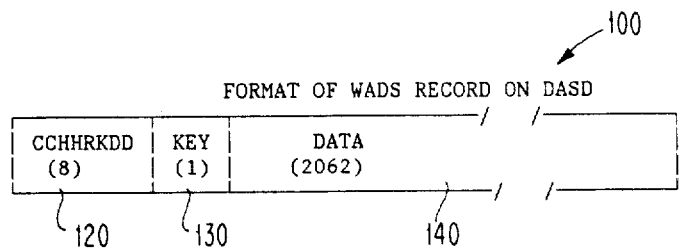
FIG. 3 is a diagrammatic illustration of the format of a WADS record.
Figure 4:
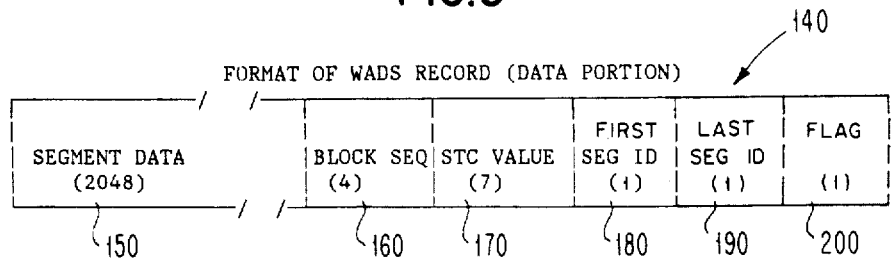
FIG. 4 is a diagrammatic illustration of the data portion of a WADS record.

Referring to FIGS. 3 and 4, WADS 70 is a fixed-block, preformatted data set, allocated to a direct access storage device (DASD), with the following format:

An eight byte CCHHRKDD field 120, where CC represents the cylinder, HH the head (or track), R the record number on the track, K the length of the key 130, and DD the length of data field 140.

A one byte key 130, which contains the same value for all records in the WADS 70 data set (e.g., X'00'.)

A fixed-length, 2062 byte data block 140, including two parts:

(1) a 2K (2048 byte) data segment 150, and
(2) a 14 byte suffix which contains:

a. A 4 byte block sequence number 160 which identifies the OLDS 80 block in buffer 60 from which the WADS 70 segment 150 is being written. Such sequence numbers start at zero with the beginning of time, and are incremented by one for each succeeding OLDS 80 block as it is initialized in a log buffer 60.

b. A 7 byte time-stamp store clock (STC) field 170 identifying the time at which the write of the WADS record 100 to DASD was initiated by WADS process 34.

c. A 1 byte segment identifier 180 for identifying the first segment 150 written in the current write operation.

d. A 1 byte segment identifier 190 for identifying the last segment 150 written in the current write operation.

Fields 160, 170, 180, and 190 are the same in all records 100 written in a given write operation to WADS 70.

e. A 1 byte flag 200. Flag 200 is set off in all segments except last segment 150 written in the current write operation to WADS 70. (This is, in the example of FIG. 5, initially segment 281.)

As will be apparent to those skilled in the art, multiple WADS 70 may be allocated and written with the same data, as protection from single or multiple (if more than two WADS 70 are written) DASD read or write failures.

Herein, each WADS 70 record 100 is preformatted on DASD in accordance with IBM standard keyed, fixed-length records with the same value assigned to all keys 130, as previously noted. When writing to WADS 70, a search for key 130 is performed, followed by the writing of data 140. Because all keys are the same, this ensures an average latency (or rotational delay) of about one half of a record 100 before data transfer can begin.

In accordance with the present invention, in response to each request to write a log record (not WADS record 100, but rather a record 270, 272, . . . see FIG. 5 below) to OLDS 80, the number of the OLDS block into which the log record is recorded, and the offset of the log record within that OLDS block, is returned to the requestor (processing program 20 or control program 30). When log records must be made non-volatile, the last block number and offset received by requestor 20,30 is passed by the requestor to log interface 24 as part of a request to commit. In response thereto, log interface 24 ensures, before returning control to requestor 20, 30, that (at least) all logged information up to and including the block number and offset specified in the commit request have been written to non-volatile storage. There are several possible conditions which may exists at the time a commit request is received by log interface 24:

1. The OLDS block containing the data to be committed has been written from buffer 60 to non-volatile OLDS 80. This implies that sufficient information was added to the log to fill the block, and the block was written to OLDS 80 in the standard manner.

2. The OLDS block containing the data to be committed has been successfully written from buffer 60 to WADS 70 through at least the offset of the data to be committed.

In both of the above cases, because the requested log data has already been written to non-volatile storage 70, 80, an immediate return may be made to requester 20 from log interface 24.

3. The block containing the data to be committed has had a write operation initiated to WADS 70 through the offset of the data to be committed, but the write operation is not yet known by log interface 24 to have successfully completed. In this case, requestor 20, 30 is suspended until the write operation is known to have completed successfully.

4. The block containing the data to be committed has not had a write operation initiated from buffer 60 to WADS 70 through the offset in buffer 60 of the data to be committed. In this case, write operations are initiated for all segments which have not been written to either OLDS 80 or WADS 70, up to and including the segment containing the offset to be committed. The requester is suspended until the write operations have been successfully completed.

Figure 5:
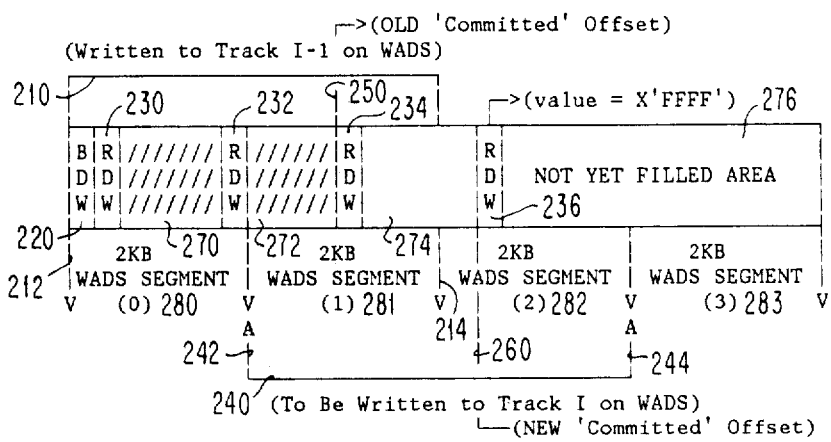
FIG. 5 is a diagrammatic illustration of the relationship between the OLDS buffer and WADS segments.

Referring now to FIG. 5, an OLDS block in log buffer 60 is illustrated as it would appear before being filled and written out to OLDS storage device 80. At this point in time, buffer portion 210 comprising WADS segments 280 and 281 (from buffer 60 location 212 to 214) has been previously written to WADS 70 track I-1 with an old committed offset of 250. Also, a process epoch has occured which requires that buffer portion 240 next be written to WADS 70, comprising WADS segments 281 and 282 from buffer locations 242 to 244. When so written, the new committed offset will be at 260. A block descriptor word (BDW) 220 and a plurality of record descriptor words (RDW) 230, 232, 234, and 236 are provided for describing the buffer contents through various length and marker fields to be described. Segments 280–283 each contain the information that is written into a segment data field 150 in a record 100.

In order that WADS 70 may be written concurrently with the placing of new log information into the segment being written, while maintaining the integrity of WADS 70, log information is placed into the OLDS main storage buffers 60 according to the following procedure. This procedure will be explained with respect to the various fields in FIG. 5 and correlated to Tables 1 through 8.

1. The start (250) and end (260) location in the buffer into which new log information is to be placed is calculated. The start 250 was calculated at Table 2, line 22, at the conclusion of a previous write, and end 260 at Table 2, lines 12–14.

2. A marker, such as X'FFFF', is placed into a record RDW 236 located beyond the last location 260 into which log information is to be placed. (Table 2, lines 15, 16.)

3. The log data is placed into the log buffer at location 274. (Table 2, line 12.)

4. BDW field 220 is updated to show the proposed new length of the filled area of the buffer. (Table 2, line 21.)

5. RDW field 234 is placed into the buffer, with the low order byte first, thus overlaying the RDW marker and removing the X'FFFF' inserted into the buffer at step 2, above, during the previous log record insertion. (Table 2, lines 19, 20.)

During restart of the system after a catastrophic error, such as power failure, the above procedure ensures that OLDS 80 can be reconstructed from WADS 70 information. If a given segment, such as WADS segment 281, contains a valid RDW field 234 (one in which the high order byte is not X'FF' because it was overlayed in step 5, above, after data 274 was placed in the buffer,) the data 274 for the log record described by the RDW 234 is valid within segment 281.

Referring once again to FIG. 5, the relationship between WADS 70 segments and the OLDS 80 block will be described. In this example, OLDS buffer 60 comprises four WADS 70 segments 280, 281, 282, and 283. The assumption in FIG. 5 is that a previous commit request was received giving location 250 as the offset value from the beginning 212 of buffer 60 through which data was to be made non-volatile, this is represented by the shaded portion of the OLDS buffer 60 in FIG. 5. As a result of that commit request, WADS 70 segments 280 and 281 were written (each segment 280, 281 as segment data 150 in separate records 100) to some WADS 70 track I-1. The identifying suffix in that write operation contains the segment identifier 180 in the first segment 280, segment identifier 190 and flag 200='ON' in the last segment 281, and an identifying time stamp 170 in both segments actually written.

When the request to commit up to the new offset 260 is received by log interface 24 (Table 2, lines 24–31), the next sequential WADS 70 track I would be chosen to receive buffer 60 data 240. This selection is made by the procedure of Table 7, at line 7, for this simple example where new segment (=2) and old segment (=1), step 3 of Table 7 evaluates to true. (The procedure of Table 7 selects the next track to be written so as to assure that valid data on a track is never overwritten.) Because the old offset 250 was within segment (1) 281, segments (1) 281 and (2) 282 will be written to WADS 70 to satisfy the new request, according to the procedure of Table 5, lines 5–37. These segments will have a new time stamp 170, and be identified with segment ID's 1, 2, OFF (in fields 180, 190, 200 respectively) of segment 281 and segment ID's 1, 2, ON in segment 282. In FIGS. 6 and 7 are set forth examples of the pertinent fields in the WADS input output block (IOB) and related sample channel program for writing two such segments to WADS 70. The assigning of the IOB for a given track is done in Table 7, line 18. In this case, the command chain (CC) flag is set off in the second set of channel command words (CCWs). Reference is made to IBM System/370 Principles of Operation, IBM publication GA22-7000-6 at pages 12.28 through 12.46 for a description of IOB's and channel programs.

Figure 11:
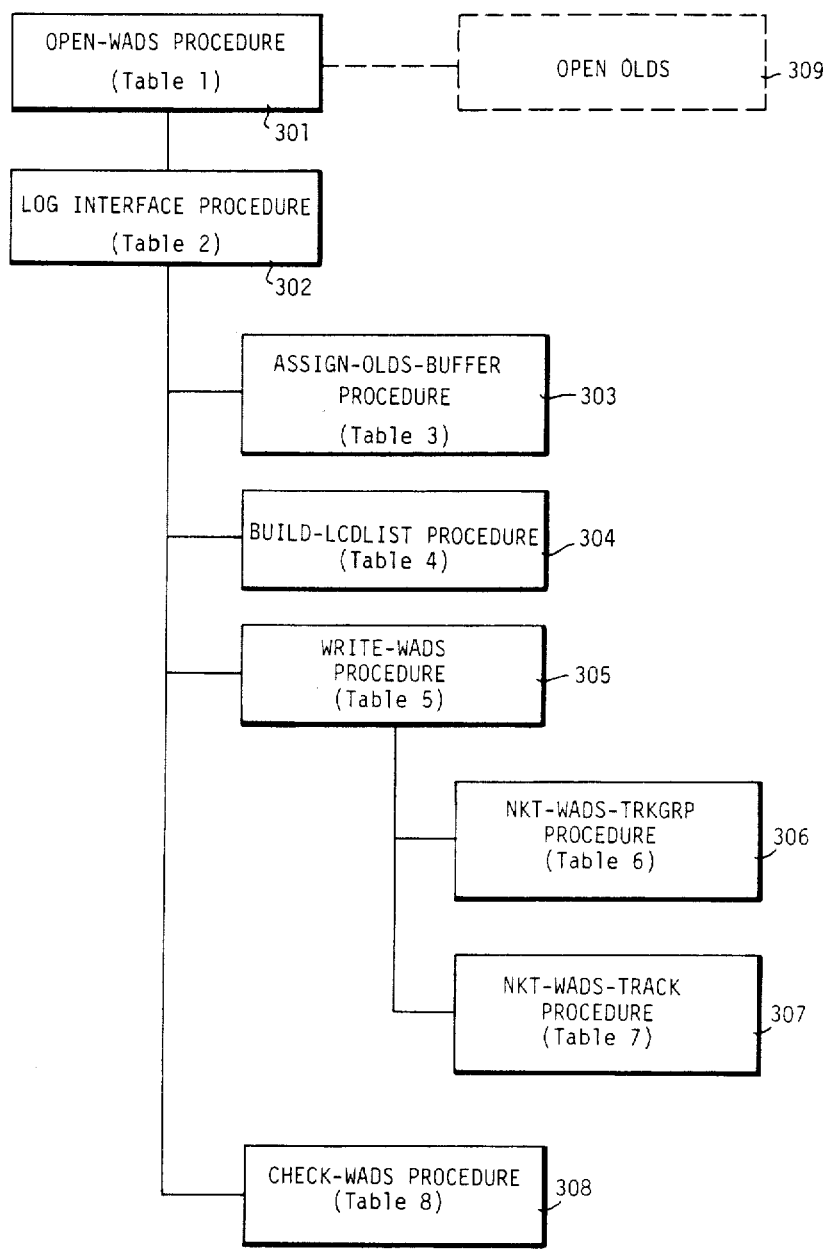
FIG. 11 is a process flow chart illustrating the relationship between the various procedures executed in practicing the method of the invention.

Referring to FIG. 11, the procedures for controlling WADS 70 are set forth.

OPEN-WADS procedure 301 assumes that the OLDS itself is already open according to procedures well known in the art. In OPEN-WADS 301 initial calculations required for coordinating the WADS and OLDS are performed, along with an optional preformatting of the WADS, as set forth in Table 1.

LOG-INTERFACE procedure 302 provides the basic log (OLDS) writing interface, as is set forth in Table 2. LOG-INTERFACE 302 issues calls to ASSIGN-OLDS-BUFFER 303, BUILD-LCDLIST 304, WRITE-WADS 305, and CHECK-WADS 308.

ASSIGN-OLDS-BUFFER procedure 303 not only assures that the OLDS-BLOCKW (see below) is updated, but also releases TRKGRPs for reassignment by the WADS subroutines. This coordination is required to ensure that the WADS can be used to rebuild the OLDS.

BUILD-LCDLIST procedure 304 builds a list of blocks containing unwritten segments to be processed by the WRITE-WADS procedure 305. In this procedure, it is assumed without loss of generality, that the OLDS buffers are in sequence by ascending block number.

WRITE-WADS procedure 305 writes segments to the WADS, and calls NXT-WADS-TRKGRP 306 and NXT-WADS-TRACK 307.

NXT-WADS-TRKGRP procedure 306 assigns the track group for each OLDS block to be written to the WADS. It is called by WRITE-WADS 305 when a different OLDS block is to be processed.

NXT-WADS-TRACK procedure 307 is used by WRITE-WADS 305 to ensure that each new group of segments to be written will use the proper pair of tracks in the assigned group, and that if the same segment requires multiple writes, it will alternate tracks for each write.

CHECK-WADS procedure 308 is called by LOG-INTERFACE 302 to ensure that the WADS was successfully written up to the point required by the requestor. It also ensures that IOBs are made available for reuse by the WRITE-WADS procedure 302.

Tables 1 through 8 define in pseudo code the method of the invention for controlling the WADS in relation to the OLDS. The pseudo code shows the write logic interactions excluding error processing, which is implementation dependent. Standard operating system functions and services are assumed. The following variables are important to the understanding of the pseudo code; other variables, labels and terms refer to the Figures previously described, or are self-explanatory in the context of the pseudo code:

OLDS-BLOCKW
The block number of the last OLDS block successfully written to OLDS 80.

WADS-BLOCK
The block number of the last OLDS block from which one or more segments have been written to WADS 70. The write may or may not have completed.

COMMIT-BLOCK
The block number of the last OLDS block from which one or more segments have been written to WADS 70. The write has been completed successfully.

OLDS-OFFSET
The offset from the beginning of the current OLDS-BLOCK to the first empty location in the buffer.

WADS-OFFSET
The offset in the last WADS-BLOCK for which a write request has been made.

COMMIT-OFFSET
The offset in the last WADS-BLOCK for which a write request has been completed successfully.

IOB
Input/output control block.

ECB
Event control block.

In Table 1 is set forth the procedure to open the WADS, illustrating the initial calculation required for proper coordination between the WADS and the OLDS. This procedure assumes that the OLDS itself is already open. The optional preformatting of the WADS is also shown. (In all of Tables 1-8, all calculations are by integer arithmetic.)

TABLE 1
OPEN-WADS PROCEDURE

OPEN-WADS PROCEDURE;
INITIALIZE CONTROL BLOCKS
DO OS OPEN FOR WADS
R = CALCULATED NUMBER OF RECORDS PER TRACK
CALCULATE NUMBER OF TRACKS IN FIRST EXTENT
TRKPOLD = OLDS-BLOCKSIZE/2048 + 1
TRKGRPS = NUMBER OF TRACKS IN FIRST EXTENT/TRKPOLD
J = 0
DO FOR I = 1 TO TRKGRPS
ADD GROUP(I) TO FREE CHAIN

TABLE 1-continued
OPEN-WADS PROCEDURE

GROUP-FIRST(I) = J
GROUP-LAST(I) = J + TRKPOLD − 1
J = J + TRKPOLD
ENDDO
INUSE CHAIN = 0
IF EMPTY WADS OR FORMAT REQUESTED THEN
DO TRACK = FIRST TRACK IN EXTENT TO LAST TRACK IN EXTENT BY 1
FORMAT THE TRACK WITH RECORDS CONTAINING STANDARD COUNT FIELD
ONE-BYTE KEY FIELD OF X'00'
2062-BYTE DATA FIELD OF X'00'
END DO
RETURN
END OPEN-WADS;

In Table 2 is set forth the log interface procedure, including write log and commit.

TABLE 2
LOG INTERFACE PROCEDURE

LOG INTERFACE PROCEDURE (FUNCTION, DATA)
CASE OF FUNCTION
WRITE-LOG:
IF LENGTH(DATA + RDW + RCDNR) > LENGTH(REMAINING OLDS BUFFER) THEN
DO
FILL OLDS BUFFER WITH DUMMY RECORD
WRITE OLDS BUFFER
CALL ASSIGN OLDS BUFFER
END
ENDIF
MOVE DATA TO OLDS BUFFER + OLDS-OFFSET + LENGTH(RDW)
MOVE RCDNR TO OLDS BUFFER + OLDS-OFFSET + LENGTH(RDW + DATA)
TEMP-OFFSET = OLDS-OFFSET + LENGTH (DATA + RDCNR)
IF TEMP-OFFSET +2 <= LENGTH(OLDS BUFFER) THEN
MOVE X'FFFF' TO OLDS-BUFFER + TEMP-OFFSET
ENDIF
RDW = LENGTH(RDW + DATA + RCDNR)
MOVE CHAR(RDW) TO OLDS BUFFER + OLDS OFFSET + 1
MOVE CHAR(RDW/256) TO OLDS BUFFER + OLDS OFFSET
BDW = BDW + RDW
OLDS-OFFSET = OLDS-OFFSET + RDW
RETURN (BLOCK-NR,OFFSET)
COMMIT:
(DATA = BLOCK-NR,OFFSET FROM WRITE)
IF BLOCK-NR <= OLDS-BLOCKW OR
BLOCK-NR < COMMIT-BLOCK OR (BLOCK-NR = COMMIT-BLOCK
AND OFFSET < COMMIT-OFFSET) THEN
RETURN
ELSE IF BLOCK-NR < WADS-BLOCK OR (BLOCK-NR = WADS-BLOCK
AND OFFSET < WADS-OFFSET) THEN
CALL CHECK-WADS(BLOCK-NR,OFFSET)
ELSE
DO
CALL BUILD-LCD-LIST (BLOCK-NR,OFFSET)
CALL WRITE-WADS (LCDLIST)
CALL CHECK-WADS(BLOCK-NR,OFFSET)
END
ENDIF
ENDIF
RETURN
OTHER FUNCTIONS:
END LOG WRITE INTERFACE

In Table 3 is presented the procedure for ensuring that the OLDS-BLOCKW is updated and for releasing TRKGRPs for reassignment by the WADS subroutines. This coordination is required to ensure that the WADS can be used to rebuild the OLDS.

TABLE 3
ASSIGN-OLDS-BUFFER PROCEDURE

```
ASSIGN-OLDS-BUFFER PROCEDURE;
IF NO OLDS BUFFERS AVAILABLE AND NO OLDS
WRITE ARE COMPLETE THEN
WAIT FOR COMPLETION OF LATEST OLDS WRITE
ENDIF
DO WHILE OLDS-BUFFERS IN WRITE STATUS AND
WRITE COMPLETED
ISSUE OS CHECK (NO WAIT SINCE WRITE IS COMPLETE)
IF OLDS-BLOCKW < BLOCK NUMBER OF WRITTEN
BUFFER THEN
OLDS-BLOCKW = BLOCK NUMBER OF WRITTEN BUFFER
ENDIF
MOVE BUFFER TO AVAILABLE QUEUE
END
DO WHILE GROUPS ARE IN INUSE CHAIN
IF GROUP BLOCK NUMBER < = OLDS-BLOCKW THEN
IF GROUP'S IOB IS IN CHECKLST AND I/O IS COMPLETE
THEN
DO
ISSUE OS CHECK FOR IOB
MOVE GROUP TO AVAILABLE CHAIN
IF SOMEONE WAITS FOR AVAILABLE GROUP THEN
POST THE WAITOR
ENDIF
ENDDO
ELSE IF NOT CURRENT GROUP THEN
DO
MOVE GROUP TO AVAILABLE CHAIN
IF SOMEONE WAITS FOR AVAILABLE GROUP THEN
POST THE WAITOR
ENDIF
ENDDO
ENDIF
ENDIF
ENDIF
ENDDO
ASSIGN OLDEST OLDS BUFFER
RETURN
END ASSIGN-OLDS-BUFFER
```

In Table 4 is set forth the procedure for building a list of blocks containing unwritten segments to be processed by the WADS write subroutine of Table 1. Without loss of generality, it is assumed that the OLDS buffers are in sequence by ascending block number.

TABLE 4
BUILD-LCDLIST PROCEDURE

```
BUILD-LCDLIST PROCEDURE;
DO FROM BEGINNING OF OLDS BUFFERS TO THE END
WHILE
BLOCK-NR => BUFFER-BLOCK
IF BUFFER-BLOCK > OLDS-BLOCKW AND
(BUFFER-BLOCK > WADS-BLOCK
OR BUFFER-BLOCK = WADS-BLOCK
AND WADS-OFFSET < LENGTH(OLDS-BUFFER) ) THEN
DO
ADD BUFFER TO LCDLIST
IF BUFFER-BLOCK < BLOCK-NR THEN
LCD-OFFSET = LENGTH(OLDS-BUFFER)
ELSE
LCD-OFFSET = OFFSET
END
ENDIF
ENDDO
RETURN
END BUILD-LCDLIST
```

In Table 5 is set forth the procedure for writing segments to the WADS.

TABLE 5
WRITE-WADS PROCEDURE

```
WRITE-WADS PROCEDURE;
DO UNTIL END OF LCDLIST
IF LCDBLK > WADS-BLOCK THEN
```

TABLE 5-continued
WRITE-WADS PROCEDURE

```
CALL NXT-WADS-TRKGRP
DO UNTIL LCD-OFFSET < = WADS-OFFSET
CALL NXT-WADS-TRACK
BUILD SUFFIX1 (OLDS-BLOCK, TIME-STAMP,
START-SEG-ID)
NR-SEGMENTS = 0
CCW-SET = FIRST
DO UNTIL WADS-OFFSET > LCD-OFFSET
NR-SEGMENTS = R
IDAW1(CCW-SET)=REAL-ADDR(LCD-BUFFER +
WADS-OFFSET)
IDAW2(CCW-SET)=REAL-ADDR(SUFFIX1)
COMMAND(CCW-SET) = CHAIN
WADS-OFFSET = WADS-OFFSET + 2048
NR-SEGMENTS = NR-SEGMENTS + 1
CCW-SET = CCW-SET + LENGTH(CCW-SET)
ENDDO
CCW-SET = CCW-SET - LENGTH(CCW-SET)
IF NR-SEGMENTS = 1 THEN
DO
LAST-SEG-ID = FIRST-SEG-ID
LAST-FLAG-1 = ON
END
ELSE
DO
LAST-SEG-ID = FIRST-SEG-ID + NR-SEGMENTS
SUFFIX2 = SUFFIX1
LAST-FLAG-1 = OFF
LAST-FLAG-2 = ON
IDAW2(CCW-SET)=REAL-ADDR(SUFFIX2)
END
COMMAND(CCW-SET) = NO-CHAIN
ISSUE EXCPVR FOR CURRENT IOB
MOVE IOB TO CHECKLIST
IF WADS-OFFSET > LCD-OFFSET THEN
WADS-OFFSET = LCD-OFFSET
ENDDO
NEXT LCD-IN-LIST
ENDDO
RETURN
END WRITE-WADS
```

In Table 6 is set forth the procedure for assigning the track group for each OLDS block to be written to the WADS. It is called by the WADS write subroutine when it determines that a new OLDS block is to be processed.

TABLE 6
NXT-WADS-TRKGRP PROCEDURE

```
NXT-WADS-TRKGRP PROCEDURE;
ADD GROUP(CURRENT) TO INUSE CHAIN
IF FREE CHAIN IS EMPTY THEN
WAIT FOR GROUP TO BE ADDED TO FREE CHAIN
ENDIF
GROUP(CURRENT) = FIRST GROUP ON FREE CHAIN
WADS-BLOCK(CURRENT) = LCDBLK
FSTTRK = GROUP-FIRST(CURRENT) - 1
CURTRK = FSTTRK
LSTTRK = GROUP-LAST(CURRENT)
LASTSEG = X'FF'
WADS-OFFSET = 0
RETURN
END NXT-WADS-TRKGRP
```

In Table 7 is set forth the procedure, called by the WADS write subroutine, to ensure that each new group of segments to be written will use the proper pair of tracks in the assigned group; and that if the same segment requires multiple writes, the procedure will alternate tracks for each write.

TABLE 7
NXT-WADS-TRACK PROCEDURE

```
NXT-WADS-TRACK PROCEDURE;
```

TABLE 7-continued
NXT-WADS-TRACK PROCEDURE

```
NEWSEG = WADS-OFFSET/2048
IF NEWSEG = LASTSEG THEN
DO
  LASTSEG = NEWSEG
  IF CURTRK = FSTTRK THEN
    FSTTRK = FSTTRK + 1
  ELSE
    LSTTRK = LSTTRK - 1
    CURTRK = FSTTRK
  END
ELSE
  IF CURTRK = FSTTRK THEN
    CURTRK = LSTTRK
  ELSE
    CURTRK = FSTTRK
  ENDIF
ASSIGN IOB AND ECB FOR THIS TRACK
CALCULATE MBBCCHHR FROM CURTRK
RETURN
END NXT-WADS-TRACK
```

In Table 8 is set forth the procedure for ensuring that the WADS was successfully written, up to the point required by the requestor.

TABLE 8
CHECK-WADS PROCEDURE

```
CHECK-WADS PROCEDURE:
FIND WADS IOB FOR WADS-BLOCK = BLOCK-NR AND
WADS-OFFSET = > OFFSET
ISSUE OS CHECK (IMPLIES WAIT) FOR THE IOB
DO FOR ALL UN-CHECKED WADS IOBS EARLIER THAN
THIS ONE
  ISSUE OS CHECK FOR IOB
  MAKE IOB AVAILABLE FOR ASSIGNMENT
ENDDO
IF COMMIT-BLOCK < BLOCK-NR
OR (COMMIT-BLOCK = BLOCK-NR AND COMMIT-OFFSET
< OFFSET) THEN
DO
  COMMIT-BLOCK = BLOCK-NR IN WADS IOB
  COMMIT-OFFSET = OFFSET IN WADS IOB
END
ENDIF
RETURN
END CHECK-WADS
```

The utility of the invention requires that it must be possible to reconstruct OLDS 80, including OLDS blocks in buffers 60, from the information contained in WADS 70 in the event of catastrophic failure of the system. In such a catastrophic failure, volatile memory is lost, but OLDS and WADS blocks written in non-volatile storage 80, 90, and the disk data base 50, survive. Some OLDS blocks may have been found only in volatile storage buffers 60, and lost. Consequently, with reference to FIG. 5, the OLDS block lost from buffer 60 would be rebuilt using segment (0) 280 from WADS track I-1, and segments (1) 281 and (2) 282 from track I. After OLDS buffer 60 block is rebuilt from WADS 70 in this manner, BDW field 220 is recalculated from RDW fields 230, 232, 234, and 236.

In general, the procedure for reconstructing OLDS buffer 60 blocks not yet written to non-volatie OLDS 80 is as follows:

1. Non-volatile OLDS 80 is read until the last (most recently written) OLDS block therein is found.

2. To select which track groups 105 contain records required for reconstructing an OLDS block, the first track (FIG. 2, track 110=1) of each track group 105 is read from WADS 70, and time stamp field 170 in the suffix of each record 100 on each first track examined to chose the records (one or more on a given track) having the latest time-stamp value. If the sequential block number 160 in a chosen record(s) 100 is greater than the block number of the last OLDS block (identified in step 1, above), and the time stamp 170 of that record is greater than the time stamp in the last OLDS block, the block number and track group of the chosen record is placed in a remembered list.

3. If the remembered list is empty, then the OLDS block is the true last block. The reconstruction is considered successfully completed.

4. Otherwise the remembered list of track groups 15 is ordered in ascending sequence by (remembered) OLDS block number to facilitate reconstruction of one or more OLDS blocks from the WADS.

5. And, consequently, the following is done for each track group 105 in the remembered list. (The example of FIGS. 8-10 is for one of such groups, in this case track group 1):

(a) Read into main storage track buffers all records on each track 110 in the group 105 into main storage buffers (as shown in FIG. 8 as an array of record buffers). In FIG. 8 is illustrated how these tracks might look at the time of failure and at such subsequent reconstruction: the record numbers RCD are taken from count field 120 digit R, and the three digits of the SEG are the values in suffix fields 180, 190, 200, respectively, with the last digit of SEG representing "last" flag 200 (0=not last, 1=last.) Records which incur I/O errors are marked with a zero time-stamp T/S. With multiple WADS, the operation would be more complex, and would include recovery attempts by reading alternate WADS.

(b) Logically rotate the record buffers of each track's records so that a string of one or more records with the latest time stamp T/S (170) is first. In FIG. 9, the records which would be chosen as pertaining to block(s) not yet written to non-volatile WADS 180 are shown. In this example, only block 104 is chosen (as block 103 has been written to OLDS 80—FIG. 1.) Those chosen records marked with * after their time stamp T/S value are selected as "first" records for their respective tracks. Records on the track which were written earlier, but for the same block, are shown prior to their being excluded as pertaining to records already on non-volatile WADS 70. (For example, Group 1, Track 1, Block 104 T/S 210 SEG 001.)

(c) For each track, do the following steps (1) through (3):

(1) Select the buffer containing the record having the latest time stamp T/S 180 and "last" flag 200 ON.

(2) If the first and last segment identifiers 180,190 differ, validate the segments by moving logically backward the number of record buffers (last to first), on this track, ensuring that the suffix of each record buffer contains the same block identifier and time-stamp, and that the start and end segment IDs match, with the last flag set OFF (not last).

(3) The validated record buffers constitute the track's contribution to the rebuilding of the OLDS block. If the search of the record buffers in the track being examined is not successful in that no record buffer searched contains a suffix with the same block, time-stamp, and start and end segment IDs with the last flag set OFF, the time-stamps of the searched record buffers on this track are set to zero. If this occurs, either the Write Channel Program (FIG. 7 is an example of a Write Channel Program) was automatically restarted, in which case there will be another sequence of buffers for the track for which the search will be successful, or the Write Channel Program was not completed successfully. In this case, except for multiple copy read recovery, the valid end of the log has been reached.

d. Sort tracks containing validated record buffers by start segment ID 180, and time stamp 170.

e. Exclude all track buffers for any track's records which (1) have a block number not equal to that of the block number of the track group remembered in step 2 or (2) have a start segment ID equal to that of another track and a lower time-stamp.

f. Allocate an OLDS buffer 60.

g. Using the first buffer of each track's records, order the tracks by increasing time-stamp value.

h. For each track, calculate the initial offset (segment ID times 2048) and move the data segment of the first WADS buffer into the OLDS buffer at the initially calculated offset, and repeat for each WADS buffer, incrementing the offset by 2048 for each buffer until the last WADS buffer for the track has been moved.

FIG. 10 illustrates the result of the OLDS block reconstruction process for block 104. Only the suffix information is shown. The 2048 byte data portions 150 associated with the identified suffixes would be used to reconstruct the OLDS block 104.

i. The OLDS block has been restored, except for the BDW 220, which is recalculated by summing each RDW until an RDW is encountered with its first byte equal to X'FF'.

j. Write the OLDS block to OLDS 80.

The last OLDS block will probably not have been completely filled. Therefore, while all committed log records have been restored, the last block will require special processing, with the last RDW, which may belong to a log record which was not committed, converted to a X'FFFF'.

We claim:

1. In a system in which data base references are first recorded in a buffer and upon said buffer being filled, transferring its contents to a first log of references and bounding synchronization points of the first (begin transaction) or second types (commit or rollback transaction) stored together with the data base in a nonvolatile memory, a method for data base recovery in the event of system failure, comprising the steps of:
   (a) formatting a second log in the memory;
   (b) writing data base references into the buffer;
   (c) monitoring buffer capacity and the occurrence of synchronization points;
   (d) transferring any accumulated buffer contents to the second log when a synchronization point occurs prior to the buffer being filled; and
   (e) in the event the data base references in the buffer are lost during system failure, redoing or undoing any changes to the data base utilizing the second log, otherwise redoing or undoing any changes utilizing the first log.

2. A method according to claim 1, comprising the further step of:
   (f) transferring the buffer contents to either the first or second log prior to the writing of any changes to the data base.

3. A method according to claim 1, wherein the step of redoing any data base changes includes reincorporating all changes to the data base starting from a known prior information state (checkpoint) using the first and second logs as a trace, said redoing step being invoked whenever a synchronization point of the second type concludes a sequence of references in the interval between the occurrence of the known prior information state and the system failure.

4. A method according to claim 1, wherein the step of undoing any data base changes includes returning the affected data base portion to a state just prior to the advent of a synchronization point of the first type starting from the state at the time of the system failure using the first and second logs as a trace to the synchronization point, said undoing step being invoked whenever a synchronization point of the first type initiates a sequence of references and there not being any termination of said sequence prior to the occurrence of the system failure.

5. In a system in which transactions denominating a sequence of data base references bounded by synchronization points of a first (begin transaction) and a second (commit or rollback transaction) type are either completed or aborted, the data base references being first recorded in a buffer and upon said buffer being filled transferring said references to a first log stored together with the data base in a nonvolatile memory, a method for ensuring the redoing and undoing of any changes to the data base in the event a system failure occurs, comprising the steps of:
   (a) formatting a second log in the memory;
   (b) writing data base references into the buffer;
   (c) monitoring the capacity of the buffer and the occurrence of synchronization points;
   (d) transferring any accumulated buffer references to the second log strobed only by the occurrence of synchronization points; and
   (e) given the unavailability of the buffer contents, redoing those transactions having synchronization points of the second type occurring in the interval between a known prior information state of the data base and the system failure and undoing those transactions having synchronization points of the first type but not of the second type occurring in said interval.

* * * * *